United States Patent
Naruse et al.

(10) Patent No.: US 6,890,698 B2
(45) Date of Patent: May 10, 2005

(54) THERMOSENSITIVE RECORDING MATERIAL AND METHOD OF PRODUCTION THEREOF

(75) Inventors: Mitsuru Naruse, Shizuoka-ken (JP); Yoshikazu Kaneko, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 10/104,121

(22) Filed: Mar. 21, 2002

(65) Prior Publication Data

US 2003/0039917 A1 Feb. 27, 2003

(30) Foreign Application Priority Data

Mar. 23, 2001 (JP) ........................................ 2001-086056

(51) Int. Cl.⁷ .............................................. G03F 7/004
(52) U.S. Cl. .................................. 430/270.1; 430/273.1
(58) Field of Search ........................... 430/270.1, 273.1

(56) References Cited

U.S. PATENT DOCUMENTS 6,395,679 B1 * 5/2002 Takeuchi ..................... 503/200

FOREIGN PATENT DOCUMENTS

| EP | 0664224 A2 | 7/1995 |
|---|---|---|
| EP | 0899126 A1 | 3/1999 |
| JP | 8151412 | 6/1996 |
| JP | 266577 | 9/1996 |
| JP | 1087936 | 4/1998 |
| JP | 11314457 | 11/1999 |

* cited by examiner

Primary Examiner—Amanda Walke
(74) Attorney, Agent, or Firm—Cooper & Dunham LLP

(57) ABSTRACT

A thermosensitive recording material having a support, a thermosensitive coloring layer provided on the support and containing a leuco dye and a color developer for developing the leuco dye upon application of heat, and a protective layer provided on the thermosensitive coloring layer and containing polyvinyl alcohol having reactive carbonyl groups, a hydrazide compound which crosslinks the polyvinyl alcohol through the reactive carbonyl groups, and a basic filler. The protective layer may be formed by applying a coating composition containing polyvinyl alcohol having reactive carbonyl groups, a hydrazide compound which crosslinks the polyvinyl alcohol through the reactive carbonyl groups, and a basic filler onto a thermosensitive coloring layer provided on a support, and drying the applied coating composition to crosslink the polyvinyl alcohol.

10 Claims, No Drawings

THERMOSENSITIVE RECORDING MATERIAL AND METHOD OF PRODUCTION THEREOF

BACKGROUND OF THE INVENTION

This invention relates generally to a thermosensitive recording material having a thermosensitive coloring layer and, more specifically, to a thermosensitive recording material having a thermosensitive coloring layer containing a leuco dye and a developer and a protective layer provided on the thermosensitive coloring layer. The present invention is also directed to a coating composition for forming the above protective layer, and to a method of production of the protective layer using the coating composition.

With diversification of information and expansion of needs therefor in recent years, various types of recording materials have been developed and put into practice in the field of information recording. Especially, thermosensitive recording materials are widely used in various fields such as information processing (output of a desk-top calculator, computer or the like), recorder for a medical measurement device, low- or high-speed facsimile, automatic ticket machine (railway ticket, admission ticket or the like), thermal copying machine, label of a POS system because of the following advantages:

(1) an image can be recorded only by applying heat;
(2) recording can be conducted with a simple mechanism, so that it is possible to downsize the device, and a recording material is easy to handle and inexpensive; and
(3) a recording material consists of one component of a thermosensitive paper.

Under such circumstances, a recording material which develops a color quickly at a high density, which is capable of producing an image with high durability and which has a recording surface having such high stability as to have no background fogging. In recent years, thermosensitive recording materials are also used in a large quantity in fields in which recorded images with high reliability are required such as label printing. It is unavoidable for such recording materials to be contacted with a plasticizer or oils and fats contained in an organic polymeric material used in a wrapping material, so that a thermosensitive recording material having resistance to such chemicals is also demanded.

In order to meet the above requirements, a protective layer has been conventionally provided on a thermosensitive recording layer. However, when used as a label or the like, the recording material has opportunities to be exposed to water, and water adhered to the recording material causes lowering of image strength, background fogging and water-peeling.

For the purpose of overcoming the drawback, it is suggested that polyvinyl alcohol (which will be hereinafter referred to as "PVA") or a modified PVA, or a mixture of PVA or a modified PVA and a waterproofing agent be used in a protective layer. Water resistance is generally obtained by crosslinking the PVA or the modified PVA.

As one method of obtaining water resistance, Japanese Laid-Open Patent Publication No. H08-151412 suggests using a PVA having a diacetone group together with a hydrazine compound. However, when the PVA composition is used in a protective layer coating liquid, a "waterproofing reaction" (crosslinking reaction) occurs in the coating liquid and the viscosity of the coating liquid increases with a lapse of time.

For the purpose of overcoming this problem, Japanese Laid-Open Patent Publication No. H11-314457 proposes a thermosensitive recording body having a protective layer containing a diacetone-modified PVA and a thermosensitive coloring layer containing a hydrazine compound. However, such a thermosensitive recording material still has problems of insufficient water resistance of the protective layer, an increase in viscosity of a coating liquid for the thermosensitive coloring layer, hindrance of color developability of the thermosensitive coloring layer by the hydrazine compound and color development of the thermosensitive coloring layer coating liquid, namely, background fogging.

Japanese Laid-Open Patent Publication No. H10-87936 proposes a PVA composition comprising a PVA copolymer containing diacetone acrylamide monomer units, a hydrazine compound and a water-soluble amine. However, when this PVA composition is used in a protective layer coating liquid of a thermosensitive recording material, the amine adversely affects a thermosensitive coloring layer at the time of coating and during storage and causes background fogging. Also, it is difficult to control the pH of the protective layer coating liquid with the amine, and the amine may increase the viscosity of the protective layer coating liquid, depending upon the amount added.

SUMMARY OF THE INVENTION

It is, therefore, an object of the present invention to provide a thermosensitive recording material which is excellent in water resistance and chemical resistance and which is free from water-peeling and background fogging.

Another object of the present invention is to provide a coating liquid for forming a protective layer or a back layer of thermosensitive recording materials.

It is a further object of the present invention to provide a method of production of a thermosensitive recording material using a coating liquid in a stable manner.

In accomplishing the foregoing objects, the present invention provides a thermosensitive recording material comprising a support, a thermosensitive coloring layer provided on said support and capable of inducing color formation upon application of heat, and a protective layer provided on the thermosensitive coloring layer and comprising polyvinyl alcohol having reactive carbonyl groups, a hydrazide compound which crosslinks the polyvinyl alcohol through said reactive carbonyl groups, and a basic filler.

In another aspect the present invention provides an aqueous coating composition in the form of a dispersion comprising a polyvinyl alcohol having reactive carbonyl groups, a hydrazide compound reactive with the reactive carbonyl groups to crosslink the polyvinyl alcohol, and a basic filler.

The present invention further provides a method for the production of a thermosensitive recording material comprising a support, a thermosensitive coloring layer provided on said support and including a leuco dye and a color developer capable of inducing color formation of said leuco dye when said thermosensitive coloring layer is heated, and a protective layer provided on said thermosensitive coloring layer, said method comprising the steps of:

applying the above aqueous coating composition on said thermosensitive coloring layer formed on said support, and drying said applied coating composition to crosslink the polyvinyl alcohol and to form said protective layer.

According to the present invention, stability of a coating liquid for a protective layer can be improved, namely, an increase in viscosity of the coating liquid with a lapse of time, which is a drawback in producing a conventional thermosensitive recording material having a protective layer containing a PVA having reactive carbonyl groups such as acetone groups and a hydrazide compound as a waterproofing agent, can be prevented, without impairing other properties of the thermosensitive recording material such as water resistance and without causing defects such as background fogging caused by, for example, adding a tertiary ammonium.

The poor stability (increase in viscosity) of the coating liquid containing a PVA having reactive acetone groups and a hydrazide compound as a waterproofing agent has been found to be attributed to the fact that the waterproofing agent causes a "waterproofing reaction (crosslinking reaction)" of the PVA in the coating liquid.

One thinkable method for preventing the crosslinking reaction in the coating liquid is to maintain the pH of the coating liquid slightly on the basic side. One specific method thereof is to add a basic material such as tertiary ammonium. However, such an additive causes color development of a thermosensitive coloring layer formed adjacent to the protective layer or hinders the aimed functions, such as chemical resistance, of the protective layer. There is also a method in which the pH of the coating liquid is adjusted by a volatile material such as ammonia. The additive improves the stability of the coating liquid but is evaporated when the coating liquid is dried and does not remain in the protective layer. In reality, however, it is difficult to completely eliminate the additive and there is a problem regarding safety of work environment. As for the stability of the coating liquid, the additive reacts with carbon dioxide in the air or evaporates with a lapse of time, so that the pH of the coating liquid is gradually changed and the effect of the additive is weakened.

As a result of intensive studies, the present inventors have found that when a basic filler is used in a protective layer as a filler, it is possible to overcome the drawbacks of the prior arts while ensuring other required functions of fillers such as improvement of head matching properties (functions of preventing breakage of the protective layer by heat from a thermal head, preventing deposition of residual substances to the thermal head, and improving transportability of the recording material in a printer).

It is conventional to add a filler in a protective layer in the field of thermal recording for the purpose of improving mechanical strengths (including friction resistance and head matching properties) of the protective layer. Also, in most cases, the filler used is kaolin, which is a acidic filler. There has been no known examples in which attention is given to basicity of a filler or in which a basic filler is used for the purpose of improving stability of a coating liquid of a protective layer.

The present invention is characterized in that the problems of the prior arts are overcome by utilizing properties of a basic filler other than the original functions thereof as a filler without using other chemicals or additives. Namely, the present invention has been made to overcome the problem of increase in viscosity which is peculiar to a coating liquid containing a PVA having monomer units containing reactive carbonyl groups and a hydrazide compound as a crosslinking agent.

Although not wishing to be bound by the theory, the mechanism of the present invention is assumed to be as follows. A minor amount of the basic filler used in the coating liquid for the protective layer is dissolved in water and brings the pH thereof to the basic side. Since the basic filler is not completely dissolved, the pH does not go too far irrespective of the added amount thereof. When the dissolved filler is affected by carbon dioxide in the air, the same amount of the basic filler is dissolved, so that the pH of the coating liquid is maintained constant.

Additionally, since the coating liquid does not contain other additives which may give adverse effects to a protective layer such as ammonia, the basic filler can improve the stability of the coating liquid without losing its original function, namely a function of improving mechanical strength of a resulting layer.

The above applies not only to the protective layer formed on a thermosensitive coloring layer, but also to a back layer disposed on the backside of the support from the protective layer.

By use of an acidic filler in a thermosensitive coloring layer, the water resistance of the protective layer can be further improved and the time necessary for the "waterproofing reaction" to complete can be shortened. The reason of this is thought to be as follows. When the protective layer coating liquid is applied over the thermosensitive coloring layer, the "waterproofing reaction" in the protective layer coating liquid is promoted by the acidic filler contained in the thermosensitive coloring layer (an inverse effect to the reaction-inhibiting effect of the basic filler).

In addition, by adding the PVA having reactive carbonyl groups to the thermosensitive coloring layer, water resistance can be imparted to the thermosensitive coloring layer (this is thought to be due to penetration of the crosslinking agent in the protective layer coating liquid into the thermosensitive coloring layer or contact of the thermosensitive layer with the crosslinking agent in the protective layer coating liquid) without adding thereto a crosslinking agent which may hinder the color developability of the thermosensitive coloring layer. This improves water resistance of the resulting thermosensitive recording material as a whole.

By adding the PVA having reactive carbonyl groups to the back layer, chemical resistance and water resistance of the back layer, and transportability of the resulting thermosensitive recording material in a printer can be improved. The PVA also has an effect of improving strength of the paper (support).

Other objects, features and advantages of the present invention will become apparent from the detailed description of the preferred embodiments to follow.

DETAILED DESCRIPTION OF THE PREFERRED EMBODIMENTS OF THE INVENTION

A thermosensitive recording material according to the present invention comprises a support, a thermosensitive coloring layer provided on the support and capable of inducing color formation upon application of heat, and a protective layer provided on the thermosensitive coloring layer. The protective layer comprises a PVA having reactive carbonyl groups, a hydrazide compound which crosslinks the PVA through the reactive carbonyl groups, and a basic filler.

The PVA having reactive carbonyl groups can be prepared by any conventionally known method, for example, by saponification of a polymer obtained by copolymerization of a vinyl monomer having a reactive carbonyl group with a fatty acid vinyl ester. Examples of the vinyl monomer having a reactive carbonyl group include a monomer having an ester residue and a monomer having an acetone group. Especially, a vinyl monomer having a diacetone group is suitably used. Specific examples of the vinyl monomer having a diacetone group are diacetone acrylamide and metadiacetone acrylamide.

Examples of the fatty acid vinyl ester include vinyl formate, vinyl acetate and vinyl propionate. Above all, vinyl acetate is preferred.

One specific example of a modified PVA is represented by the following formula:

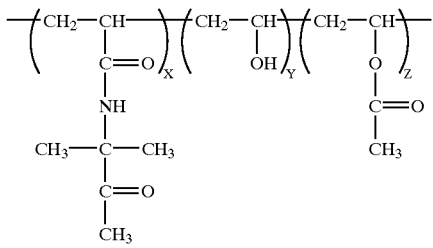

wherein X, Y and Z are molar fractions of respective monomer units and X+Y+Z=1.

The PVA having reactive carbonyl groups for use in the present invention may contain one or more copolymerizable vinyl monomers. Examples of the copolymerizable vinyl monomer include an acrylic ester, butadiene, ethylene, propylene, acrylic acid, methacrylic acid, maleic acid, maleic anhydride and itaconic acid.

The PVA having reactive carbonyl groups for use in the present invention preferably has a content of the reactive carbonyl groups of 0.05–50% by mole, more preferably 0.5–20% by mole, based on a total moles of monomer units of the polymer. Considering water resistance of the thermosensitive recording material, the content of the reactive carbonyl groups is preferably 2–10% by mole based on a total of the polymer. When the content of the reactive carbonyl groups is in this range, sufficient water resistance for use in practice can be obtained without posing an economical problem.

The PVA having reactive carbonyl groups for use in the present invention generally has a polymerization degree in the range of 300–3000, preferably 500–2200, and preferably has a saponification degree of 80% or higher.

As a hydrazide crosslinking agent for use in the present invention, any compound having a hydrazide group can be employed. Examples of the hydrazide compound include but are not limited to carbohydrazide, dihydrazide oxalate, hydrazide formate, hydrazide acetate, dihydrazide malonate, dihydrazide succinate, dihydrazide adipate, hydrazide azelate, dihydrazide sabacate, dihydrazide didodecanoate, dihydrazide maleate, hydrazide fumarate, dihydrazide itaconate, hydrazide benzonate, dihydrazide glutarate, hydrazide diglycolate, dihydrazide tartrate, dihydrazide malate, hydrazide isophthalate, dihydrazide terephthalate, dihydrazide 2,7-naphthoate, and hydrazide polyacrylate. The hydrazide compounds may be used alone or in combination.

Above all, dihydrazide adipate is preferred from the standpoint of water resistance and safety.

If desired, the hydrazide compound may be used in conjunction with another crosslinking agent, such as glyoxal, melamine, an aziridine compound, a polyamide epichlorohydrin resin, zirconium ammon carbonate and ethylenediamine, in such an amount that does not adversely affect the function of the hydrazide compound.

In the present invention, the crosslinking agent is added in an amount of preferably 0.1–20% by weight, more preferably 1–10% by weight, based on an amount of the PVA, although it depends on the modification degree and the type of the functional group of the PVA.

It is important that a basic filler be contained in the protective layer of the thermosensitive recording material of the present invention. Examples of the basic filler include aluminum hydroxide, calcium carbonate, talc, and basic silicates. Among those, aluminum hydroxide and calcium carbonate are preferred for reasons of matching properties with a thermal head (freedom of adhesion of residual substances to a thermal head) and so on. Especially preferred is the use of aluminum hydroxide because it has a moderate water solubility which makes it easy to control the pH of a coating liquid for the formation of a protective layer. The basic filler preferably has a particle diameter in the range of 0.01–50 μm, more preferably 0.1–3 μm. The amount of the basic filler is preferably 0.01–20 parts by weight, more preferably 0.5–5 parts by weight, per part of the PVA resin.

In the thermosensitive coloring layer of the present invention, leuco dyes are used alone or in combination as a coloring agent. Any leuco dye generally used in thermosensitive recording materials of this type, such as triphenylmethane type leuco compounds, fluoran type leuco compounds, phenothiazine type leuco compounds, auramine type leuco compounds, spiropyran type leuco compounds, and indolinophthalide type leuco compounds can be employed. Specific examples of such leuco dyes include
3,3-bis(p-dimethylaminophenyl)phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)]xanthylbenzoic acid lactam,
3-diethylamino-6-methyl-7-(m-trichloromethylanilino) fluoran,
3-diethylamino-7-(o-chloroanilino)fluoran,
3-di-n-butylamino-7-(o-chloroanilino)fluoran,
3-(N-methyl-N-n-amylamino)-6-methyl-7-anilinofluoran,
3-(N-methyl-N-cyclohexylamino)-6-methyl-7-anilinofluoran,
3-diethylamino-6-methyl-7-anilinofluoran,
3-(N, N-diethylamino)-5-methyl-7-(N,N-dibenzyl-amino) fluoran, benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'methylphenyl)phthalide, 3-(2'-methoxy-4'-dimethylaminophenyl)-3-(2'-hydroxy-4'-chloro-5'-methylphenyl)phthalide,
3-(N-ethyl-N-tetrahydrofurfurylamino)-6-methyl-7-anilinofluoran,
3-N-ethyl-N-(2-ethoxypropyl)amino-6-methyl-7-anilinofluoran,
3-(N-methyl-N-isobutylamino)-6-methyl-7-anilinofluoran,
3-morphorino-7-(N-propyl-trifluoromethylanilino) fluoran,
3-pyrrolidino-7-trifluoromethylanilinofluoran, 3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino) fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino) fluoran,
3-di-n-butylamino-6-methyl-7-anilinofluoran,
3,6-bis(dimethylamino)fluorenespiro(9,3')-6'-dimethylaminophthalide,
3-(N-benzyl-N-cyclohexylamino)-5,6-benzo-7-α-naphthylamino-4'-bromofluoran,
3-diethylamino-6-chloro-7-anilinofluoran,
3-diethylamino-6-methyl-7-mesidino-4',5'-benzofluoran,
3-(N-methyl-N-isopropylamino)-6-methyl-7-anilinofluoran,
3-(N-ethyl-N-isoamylamino)-6-methyl-7-anilinofluoran,
3-diethylamino-6-methyl-7-(2',4'-dimethylanilino) fluoran,
3-monopholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(a-phenylethylamino)fluoran,
3-(N-ethyl-p-toluidino)-7-(a-phenylethylamino)fluoran,
3-diethylamino-7-(o-methoxycarbonylphenylamino) fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino) fluoran,
3,6-bis(dimethylamino)fluorenespiro(9,3')-6'-dimethylaminophthalide,
3-(N-benzyl-N-cyclohexylamino)-5,6-benzo-7-α-naphthylamino-4'-bromofluoran,
3-diethylamino-6-chloro-7-anilinofluoran,
3-[N-ethyl-N-(2-ethoxypropyl)amino]-6-methyl-7-anilinofluoran,
3-(N-ethyl-N-tetrahydrofurfurylamino)-6-methyl-7-anilinofluoran,
3-diethylamino-6-methyl-7-mesidino-4',5'-benzofluoran,
3-(p-dimethylaminophenyl)-3-[1,1-bis(p-dimethylaminophenyl)ethylene-2-yl]phthalide,
3-(p-dimethylaminophenyl)-3-[1,1-bis(p-dimethylaminophenyl)ethylene-2-yl]-6-dimethylaminophthalide,
3-(p-dimethylaminophenyl)-3-(1-p-dimethylaminophenyl-1-phenylethylene-2-yl)phthalide,
3-(p-dimethylaminophenyl)-3-(1-p-dimethylaminophenyl-1-p-chlorophenylethylene-2-yl)-6-dimethylaminophthalide,
3-(4'-dimethylamino-2'-methoxy)-3-(1"-p-dimethylaminophenyl-1"-p-chlorophenyl-1",3"-butadiene-4"-yl)benzophthalide,
3-(4'-dimethylamino-2'-benzyloxy)-3-(1"-p-dimethylaminophenyl-1"-phenyl-1",3"-butadiene-4"-yl) benzophthalide,
3-dimethylamino-6-dimethylamino-fluoren-9-spiro-3'-(6'-dimethylamino)phthalide,
3,3-bis[2-(p-dimethylaminophenyl)-2-(p-methoxyphenyl) ethenyl]-4,5,6,7-tetrachlorophthalide,
3-bis[1,1-bis(4-pyrrolidinophenyl)ethylene-2-yl]-5,6-dichloro-4,7-dibromophthalide,
bis(p-dimethylaminostyryl)-1-naphthalenesulfonylmethane, and
bis(p-dimethylaminostyryl)-1-p-tolylsulfonylmethane.

In the thermosensitive coloring layer of the present invention, a variety of electron-accepting compounds or oxidants are used as a color developer for developing the leuco dye when coming in contact therewith under application of heat. Such materials are well-known and specific examples thereof include but are not limited to
4,4'-isopropylidenediphenol,
4,4'-isopropylidenebis(o-methylphenol),
4,4'-sec-butylidenebisphenol,
4,4'-isopropylidenebis(2-tert-butylphenol), zinc p-nitrobenzoate,
1,3,5-tris(4-tert-butyl-3-hydroxy-2,6-dimethyl-benzyl) isocyanuric acid,
2,2-(3,4'-dihydroxyphenyl)propane,
bis(4-hydroxy-3-methylphenyl)sulfide,
4-[β-(p-methoxyphenoxy)ethoxy]salicylic acid,
1,7-bis(4-hydroxyphenylthio)-3,5-dioxaheptane,
1,5-bis(4-hydroxyphenylthio)-5-oxapentane,
monocalcium salt of monobenzyl phthalate,
4,4'-cyclohexylidenediphenol,
4,4'-isopropylidenebis(2-chlorophenol),
2,2'-methylenebis(4-methyl-6-tert-butylphenol),
4,4'-butylidenebis(6-tert-butyl-2-methyl)phenol,
1,1,3-tris(2-methyl-4-hydroxy-5-tert-butylphenyl)butane,
1,1,3-tris(2-methyl-4-hydroxy-5-cyclohexylphenyl)-butane,
4,4'-thiobis(6-tert-butyl-2-methylphenol),
4,4'-diphenolsulfone,
4-isopropoxy-4'-hydroxydiphenylsulfone,
4-benzyloxy-4'-hydroxydiphenylsulfone,
4,4'-diphenolsulfoxide,
isopropyl p-hydroxybenzoate,
benzyl p-hydroxybenzoate,
benzyl protocatechuate,
stearyl gallate,
lauryl gallate,
octyl gallate,
1,3-bis(4-hydroxyphenylthio)propane,
N,N'-diphenylthiourea,
N,N'-di(m-chlorophenyl)thiourea,
salicylanilide,
bis(4-hydroxyphenyl)methyl acetate,
bis(4-hydroxyphenyl)benzyl acetate,
1,3-bis(4-hydroxycumyl)benzene,
1,4-bis(4-hydroxycumyl)benzene,
2,4'-diphenolsulfone,
2,2'-diallyl-4,4'-diphenolsulfone,
3,4-dihydroxyphenyl-4'-methyldiphenylsulfone,
zinc 1-acetyloxy-2-naphthoate,
zinc 2-acetyloxy-1-naphthoate,
zinc 2-acetyloxy-3-naphthoate,
α,α-bis(4-hydroxyphenyl)-α-methyltoluene,
antipyrine complex of zinc thiocyanate,
tetrabromobisphenol A,
tetrabromobisphenol S,
4,4'-thiobis(2-methyiphenol), and
4,4'-thiobis(2-chlorophenol).
The color developers may be used alone or in combination.

In the thermosensitive recording material of the present invention, the color developer is used in an amount of 1–20 parts by weight, preferably 2–10 parts by weight, per 1 part of the coloring agent.

In producing the thermosensitive recording material of the present invention, a binder can be used in the thermosensitive coloring layer for securely fixing the leuco dye and the color developer on a support. Specific examples of the binder include but are not limited thereto PVA; starch and its derivatives; cellulose derivatives such as hydroxymethyl cellulose, hydroxyethyl cellulose, carboxymethyl cellulose, methyl cellulose, and ethyl cellulose; water-soluble polymers such as sodium polyacrylate, polyvinylpyrrolidone, acrylamide-acrylate copolymer, acrylamide-acrylate-methacrylic acid terpolymer, alkali metal salts of styrene-maleic anhydride copolymer, alkali metal salts of isobutylene-maleic anhydride copolymer, polyacrylamide, sodium alginate, gelatin, and casein; an emulsion of a resin such as polyvinyl acetate, polyurethane, polyacrylic acid, polyacrylate, vinyl chloride-vinyl acetate copolymer, polybutyl methacrylate and ethylene-vinyl acetate copolymer; and a latex such as styrene-butadiene copolymer, and styrene-butadiene-acryl terpolymer. Especially preferred is the use of a PVA having a reactive carbonyl group. The binders may be used alone or in combination.

The thermosensitive recording material of the present invention may contain a thermofusible material as a thermosensitivity improving agent. Specific examples of the thermofusible material include but are not limited thereto fatty acids such as stearic acid and behenic acid; fatty acid amides such as stearic acid amide and palmitic acid amide; fatty acid metal salts such as zinc stearate, aluminum stearate, calcium stearate, zinc palmitate and zinc behenate; p-benzylbiphenyl, terphenyl, triphenyl methane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, guaiacol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio) ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy) biphenyl, p-aryloxybiphenyl, p-propagyloxybiphenyl, dibenzoyloxymethane, dibenzoyloxypropane, dibenzyldisulfide, 1,1-diphenylethanol, 1,1-diphenylpropanol, p-benzyloxybenzylalcohol, 1,3-phenoxy-2-propanol, N-octadecylcarbamoyl-p-methoxycarbonylbenzene, N-octadecylcarbamoylbenzene, 1,2-bis(4-methoxyphenoxy)propane, 1,5-bis(4-methoxyphenoxy)-3-oxapentane, dibenzyl oxalate, bis(4-methylbenzyl)oxalate and bis(4-chlorobenzyl)oxalate.

The thermosensitive coloring layer is formed by a method comprising the steps of uniformly dispersing or dissolving a color developer and a coloring agent in water together with a binder and so on to prepare a thermosensitive coloring layer coating liquid, applying the coating liquid over a support and drying the applied coating liquid. The method of coating is not specifically limited.

The thermosensitive coloring layer coating liquid preferably has a dispersion diameter of not greater than 5 μm, more preferably not greater than 1 μm.

The thermosensitive coloring layer is formed to a thickness in the order of 1–50 μm, preferably in the order of 3–20 μm, although it depends on the composition of the thermosensitive coloring layer and the usage of the resulting thermosensitive recording material.

The thermosensitive coloring layer coating liquid may contain various additives, such as a filler, generally used in production of thermosensitive recording material for the purpose of improving recording characteristics, as desired.

As a filler for use in a thermosensitive coloring layer of the present invention, any known filler can be used. Examples of the filler include but are not limited to inorganic pigments such as calcium carbonate, zinc oxide, aluminum oxide, titanium dioxide, silica, aluminum hydroxide, barium sulfate, talc, kaolin, alumina and clay; and known organic pigments. Considering water resistance (water-peeling resistance), the use of an acidic pigment (a pigment which exhibits acidity when dissolved in water) such as silica, kaolin and alumina is preferred. Especially preferred is the use of silica for a reason of color developing density.

The protective layer may be formed on the above thermosensitive coloring layer by applying an aqueous coating composition in the form of a dispersion, which composition includes a polyvinyl alcohol having reactive carbonyl groups, a hydrazide compound capable of reacting with the reactive carbonyl groups and of crosslinking the polyvinyl alcohol, and a basic filler, on the thermosensitive coloring layer formed on the support, and drying the applied coating composition to crosslink the PVA. The method of coating is not specifically limited.

If desired, the thermosensitive recording material of the present invention may be provided with a back layer on the opposite side of the support from the protective layer. In this case, the back layer may have a constitution similar to that of the protective layer. Namely, the back layer may also includes a PVA having reactive carbonyl groups, a hydrazide compound which crosslinks the PVA through the reactive carbonyl groups, and a basic filler.

The back layer may further contain a pigment, a lubricant, a crosslinking agent and so on in order to improve anti-blocking properties and dryability at the time of coating.

The support for use in the thermosensitive recording material of the present invention may be either an acid paper or a neutralized paper. When a neutralized paper support or a release paper of a neutralized paper is employed, the calcium content thereof is preferably low. A neutralized paper having a low calcium content is obtained by reducing a proportion of old paper used in paper making. In general, calcium carbonate is used as an internal additive and alkylketene dimer, alkenylsuccinic anhydride or the like is used as a sizing agent in paper making. A neutralized paper having a low calcium content can be also obtained when talc or silica is used as the internal additive in place of calcium carbonate together with a neutral rosin sizing agent.

The thermosensitive recording material of the present invention includes a thermosensitive coloring layer and a protective layer provided on the support, and, optionally, a back layer provided on the reverse side of the support. The above layers are not necessarily provided adjacent to each other. An intermediate layer may be provided between the support and the thermosensitive coloring layer, between the thermosensitive coloring layer and the protective layer, or between the support and the back layer. Especially, it is preferred that an insulating layer be provided between the support and the thermosensitive coloring layer. When the insulating layer is provided, it is preferred that hollow resin particles having a hollowness of 80% or grater be used as a filler.

Each of the above layers may consist of a single layer or a plurality of layers.

The method of recording on the thermosensitive recording material of the present invention is not specifically limited. The recording may be conducted with a heat pen, a thermal head or by laser heating or the like depending upon the usage of the thermosensitive recording material.

The following examples and comparative examples will further describe the present invention in detail. "Parts" and "%" are both by weight.

EXAMPLE 1

Preparation of Dye Dispersion (Liquid A)

A composition comprising 20 parts of 3-dibutylamino-6-methyl-N-7-anilinofluorane, 20 parts of a 10% aqueous solution of PVA, and 60 parts of water was dispersed in a sand mill until the solid components thereof had an average particle size of 0.5 µm.

Preparation of Liquid B

A composition comprising 20 parts of 4-isopropoxy-4'-hydroxydiphenylsulfone, 10 parts of di-(p-methylbenzyl) oxalate, 10 parts of calcium carbonate, 30 parts of a 10% aqueous solution of PVA and 30 parts of water was dispersed in a ball mill until the solid components thereof had an average particle size of 0.5 µm.

Preparation of Thermosensitive Coloring Layer Coating Liquid

20 Parts of Liquid A, 60 parts of Liquid B, 30 parts of a carboxy-modified PVA (solid content: 10%, KL-318, made by Kuraray Co., Ltd.), 1 part of an aqueous solution of dioctylsulfosuccinic acid (solid content: 5%) were mixed to prepare a thermosensitive coloring layer coating liquid.

Preparation of Protective Layer Coating Liquid

40 Parts of an aluminum hydroxide dispersion (solid content: 50%), 6 parts of a zinc stearate dispersion (solid content: 30%), 1 part of an aqueous solution of dioctylsulfosuccinic acid (solid content: 5%), 200 parts of a 10% solution of a diacetone group-containing PVA (diacetone monomeric unit content: 4% by mole, polymerization degree: 1600, saponification degree: 98%, made by Shin-Etsu Chemical Co., Ltd.), 10 parts of an aqueous solution of hydrazide adipate (crosslinking agent, solid content: 10%) and 43 parts of water were mixed to prepare a protective layer coating liquid.

Production of Thermosensitive Recording Material

The thermosensitive coloring layer coating liquid was coated on one side of a support (a high-quality paper having a basis weight of about 60 g/m$^2$) and dried to form a thermosensitive coloring layer having a coating weight of about 0.6 g/m$^2$ on a dry basis. The protective layer coating liquid was coated over the thermosensitive coloring layer and dried to form a protective layer having a coating weight of about 3 g/m$^2$ on a dry basis, thereby obtaining a thermosensitive recording material.

EXAMPLE 2

Preparation of Back Layer Coating Liquid 40 parts of an aluminum hydroxide dispersion, 1 part of an aqueous solution of dioctylsulfosuccinic acid (solid content: 5%), 200 parts of the same 10% aqueous solution of the diacetone group-containing PVA as used in Example 1, 10 parts of an aqueous solution of hydrazide adipate (crosslinking agent, solid content: 10%) and 43 parts of water were mixed to prepare a back layer coating liquid.

A thermosensitive recording material was produced in the same manner as in Example 1 and the back layer coating liquid was coated on the reverse side of the support and dried to form a back layer having a coating weight of about 1 g/m$^2$ on a dry basis. The back layer was then subjected to a calender treatment, thereby obtaining a thermosensitive recording material of Example 2.

EXAMPLE 3

A thermosensitive recording material was produced in the same manner as in Example 2 except that a calcium carbonate dispersion (solid content: 50%) was used in place of the aluminum hydroxide dispersion in preparation of the protective layer coating liquid and the back layer coating liquid.

EXAMPLE 4

A thermosensitive recording material was produced in the same manner as in Example 2 except that silica was used in place of the calcium carbonate in preparation of Liquid B.

EXAMPLE 5

A thermosensitive recording material was produced in the same manner as in Example 2 except that kaolin was used in place of the calcium carbonate used in preparation of Liquid B.

EXAMPLE 6

A thermosensitive recording material was produced in the same manner as in Example 2 except that a 10% aqueous solution of a diacetone amide group-containing PVA (diacetone monomeric unit content: 2% by mole, polymerization degree: 1600, saponification degree: 98%, made by Shin-Etsu Chemical Co., Ltd.) was used in place of the PVA aqueous solution in preparation of the thermosensitive coloring layer coating liquid.

EXAMPLE 7

A thermosensitive recording material was produced in the same manner as in Example 4 except that the same 10% aqueous solution of the diacetone amide group-containing PVA as used in Example 6 was used in place of the PVA aqueous solution in preparation of the thermosensitive coloring layer coating liquid.

COMPARATIVE EXAMPLE 1

A thermosensitive recording material was produced in the same manner as in Example 2 except that a kaoline dispersion (solid content: 50%) was used in place of the aluminum hydroxide dispersion in preparation of the protective layer coating liquid.

COMPARATIVE EXAMPLE 2

A thermosensitive recording material was produced in the same manner as in Example 2 except that a kaoline dispersion (solid content: 50%) was used in place of the aluminum hydroxide dispersion in preparation of the protective layer coating liquid and the back layer coating liquid.

COMPARATIVE EXAMPLE 3

A thermosensitive recording material was produced in the same manner as in Example 2 except that a silica dispersion (solid content: 25%) was used in place of the aluminum hydroxide dispersion in preparation of the protective layer coating liquid and the back layer coating liquid.

COMPARATIVE EXAMPLE 4

A thermosensitive recording material was produced in the same manner as in Example 2 except that a alumina dispersion (solid content: 40%) was used in place of the aluminum hydroxide dispersion in preparation of the protective layer coating liquid and the back layer coating liquid.

COMPARATIVE EXAMPLE 5

Preparation of Protective Layer Coating Liquid (Liquid C)

40 Parts of a kaoline dispersion (solid content: 50%), 6 parts of a zinc stearate dispersion (solid content: 30%), 1 part of an aqueous solution of dioctylsulfosuccinic acid (solid content: 5%), 200 parts of the same 10% aqueous solution of the diacetone group-containing PVA as used in Example 1, 10 parts of an aqueous solution of hydrazide adipate (crosslinking agent, solid content: 10%), 4 parts of isopropyl amine and 43 parts of water were mixed to prepare a protective layer coating liquid.

A thermosensitive recording material was produced in the same manner as in Example 2 except that the Liquid C was used for the protective layer coating liquid.

COMPARATIVE EXAMPLE 6

Preparation of Protective Layer Coating Liquid (Liquid D)

40 Parts of a kaoline dispersion (solid content: 50%), 6 parts of a zinc stearate dispersion (solid content: 30%), 1 part of an aqueous solution of dioctylsulfosuccinic acid (solid content: 5%), 200 parts of the same 10% aqueous solution of the diacetone group-containing PVA as used in Example 1, and 0.53 parts of water were mixed to prepare a protective layer coating liquid.

Preparation of Thermosensitive Coloring Layer Coating Liquid (Liquid E)

20 Parts of Liquid A, 60 parts of Liquid B, 30 parts of the same carboxy-modified PVA as used in Example 1, 1 part of an aqueous solution of dioctylsulfosuccinic acid (solid content: 5%), 0.3 parts of an aqueous solution of hydrazide adipate (crosslinking agent, solid content: 10%) were mixed to prepare a thermosensitive coloring layer coating liquid.

A thermosensitive recording material was produced in the same manner as in Example 2 except that the Liquid D was used for the protective layer coating liquid and the Liquid E was used for the thermosensitive coloring layer coating liquid 2.

The constitution of the thermosensitive recording materials of Examples 1 to 7 and Comparative Examples 1 to 6 are summarized in Tables 1-1 through 1-3. The thermosensitive recording materials were evaluated as follows. The results are summarized in Table 2.

Water Resistance

A sample of the thermosensitive recording material was immersed in water at room temperature and rubbed with a finger ten times. The state after the rubbing was observed and graded according to the following standards.

A: No peeling occurred.

B: No peeling occurred but the surface became a little sticky. (No problem in practical use.)

C: A slight peeling was observed.

D: Protective layer was dissolved.

Stability of Coating Liquid

The coating liquid was allowed to stand at room temperature (22° C.) for 72 hours. Then, the state of the coating liquid was observed and graded according to the following standards A: The viscosity hardly increased.

B: The viscosity increased.

C: The coating liquid lost fluidity.

Chemical Resistance

An image was formed on a sample thermosensitive recording material with a heat block at 180° C. A vinyl chloride wrapping film containing a plasticizer was affixed to the printed surface or a surface of the back layer. The sample was then allowed to stand at 40° C. for 24 hours. From the difference between image densities before and after the test, an image residual rate was calculated.

Image residual rate=(Image density before test/Image density after test)×100

Background Discoloration (Background Fogging)

A change in color of the background at the time when the protective layer coating liquid was applied and dried was observed with naked eyes.

TABLE 1-1

| | Constitution of Thermosensitive Material | | | |
|---|---|---|---|---|
| | Protective layer | | | |
| | Resin | Crosslinking agent | Filler | Stabilizer |
| Ex. 1 | Diacetone group-containing PVA | Hydrazide adipate | Aluminum hydroxide | Nil |
| Ex. 2 | Diacetone group-containing PVA | Hydrazide adipate | Aluminum hydroxide | Nil |
| Ex. 3 | Diacetone group-containing PVA | Hydrazide adipate | Calcium Carbonate | Nil |
| Ex. 4 | Diacetone group-containing PVA | Hydrazide adipate | Aluminum hydroxide | Nil |
| Ex. 5 | Diacetone group-containing PVA | Hydrazide adipate | Aluminum hydroxide | Nil |
| Ex. 6 | Diacetone group-containing PVA | Hydrazide adipate | Aluminum hydroxide | Nil |
| Ex. 7 | Diacetone group-containing PVA | Hydrazide adipate | Aluminum hydroxide | Nil |

TABLE 1-2

| | Constitution of Thermosensitive Material | | | |
|---|---|---|---|---|
| | Protective layer | | | |
| | Resin | Crosslinking agent | Filler | Stabilizer |
| Comp. Ex. 1 | Diacetone group-containing PVA | Hydrazide adipate | Kaolin | Nil |
| Comp. Ex. 2 | Diacetone group-containing PVA | Hydrazide adipate | Kaolin | Nil |
| Comp. Ex. 3 | Diacetone group-containing PVA | Hydrazide adipate | Silica | Nil |
| Comp. Ex. 4 | Diacetone group-containing PVA | Hydrazide adipate | Alumina | Nil |
| Comp. Ex. 5 | Diacetone group-containing PVA | Hydrazide adipate | Kaolin | Isopropyl amine |
| Comp. Ex. 6 | Diacetone group-containing PVA | Nil | Kaolin | Nil |

TABLE 1-3

| | Constitution of Thermosensitive Material | | | |
|---|---|---|---|---|
| | Thermosensitive coloring layer | | | Back layer Filler |
| | Resin | Filler | Crosslinking agent | |
| Ex. 1 | Carboxyl group-containing PVA | Calcium Carbonate | Nil | No back layer |
| Ex. 2 | Carboxyl group-containing PVA | Calcium Carbonate | Nil | Aluminum hydroxide |
| Ex. 3 | Carboxyl group-containing PVA | Calcium Carbonate | Nil | Calcium Carbonate |
| Ex. 4 | Carboxyl group-containing PVA | Silica | Nil | Aluminum hydroxide |
| Ex. 5 | Carboxyl group-containing PVA | Kaolin | Nil | Aluminum hydroxide |
| Ex. 6 | Diacetone group-containing PVA | Silica | Nil | Aluminum hydroxide |
| Ex. 7 | Diacetone group-containing PVA | Kaolin | Nil | Aluminum hydroxide |
| Comp. Ex. 1 | Carboxyl group-containing PVA | Calcium Carbonate | Nil | No back layer |
| Comp. Ex. 2 | Carboxyl group-containing PVA | Calcium Carbonate | Nil | Kaolin |
| Comp. Ex. 3 | Carboxyl group-containing PVA | Calcium Carbonate | Nil | Kaolin |
| Comp. Ex. 4 | Carboxyl group-containing PVA | Calcium Carbonate | Nil | Kaolin |
| Comp. Ex. 5 | Carboxyl group-containing PVA | Calcium Carbonate | Nil | Kaolin |
| Comp. Ex. 6 | Carboxyl group-containing PVA | Calcium Carbonate | Hydrazide adipate | Kaolin |

TABLE 2

| | Test Results | | | | | | |
|---|---|---|---|---|---|---|---|
| | Protective layer | | | | Back layer | | |
| | Test 1 | Test 2 | Test 3 | Test 4 | Test 1 | Test 2 | Test 3 |
| Ex. 1 | B | A | 0.93 | Not observed | — | — | — |
| Ex. 2 | B | A | 0.93 | Not observed | A | A | 0.98 |
| Ex. 3 | B | A | 0.92 | Not observed | A | A | 0.98 |
| Ex. 4 | A | A | 0.93 | Not observed | — | — | — |
| Ex. 5 | A | A | 0.93 | Not observed | — | — | — |
| Ex. 6 | A | A | 0.90 | Not observed | — | — | — |
| Ex. 7 | A | A | 0.93 | Not observed | — | — | — |
| Comp. Ex. 1 | B | C | 0.93 | Not observed | — | — | — |
| Comp. Ex. 2 | B | C | 0.93 | Not observed | A | C | 0.95 |
| Comp. Ex. 3 | B | C | 0.90 | Not observed | — | — | — |
| Comp. Ex. 4 | B | C | 0.90 | Not observed | — | — | — |
| Comp. Ex. 5 | B | B | 0.85 | Observed | — | — | — |
| Comp. Ex. 6 | D | A | 0.80 | Not observed | — | — | — |

Test 1: Water resistance
Test 2: Stability of coating liquid
Test 3: Chemical resistance
Test 4: Background discoloration (Background fogging)

As is clear from the test results summarized in Table 2, the thermosensitive recording material according to the present invention is excellent in coating liquid stability, water resistance and chemical resistance, and free from background discoloring.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2001-86056, filed Mar. 23, 2001, inclusive of the specification and claims, are hereby incorporated by reference herein.

What is claimed is:

1. An aqueous coating composition in the form of a dispersion comprising a polyvinyl alcohol having reactive carbonyl groups, a hydrazide compound reactive with the reactive carbonyl groups to crosslink the polyvinyl alcohol, and a basic filler, wherein a pH of the aqueous coating composition is on the basic side.

2. A process for forming a thermosensitive recording material, comprising the steps of:
   applying a thermosensitive coloring layer coating liquid on one side of a support and drying the coating liquid so as to form a thermosensitive coloring layer on the support; and
   applying an aqueous coating composition on the formed thermosensitive coloring layer and drying the aqueous coating composition so as to form a protective layer on the thermosensitive coloring layer,
   wherein the aqueous coating composition comprises polyvinyl alcohol having reactfve carbonyl groups, a hydrazide compound and a basic filler, and wherein the aqueous coating composition has a pH value which is basic.

3. A process for forming a thermosensitive recording material according to claim 2, wherein the basic filler is selected from a group consisting of aluminum hydroxide and calcium carbonate.

4. A process for forming a thermosensitive recording material according to claim 2, wherein the basic filler has a particle diameter in a range of 0.01 $\mu$m to 50 $\mu$m.

5. A process for forming a thermosensitive recording material according to claim 2, wherein the content of the basic filler is 0.01 parts by weight to 20 parts by weight with respect to 100 parts by weight of the polyvinyl alcohol having reactive carbonyl groups.

6. A process for forming a thermosensitive recording material according to claim 2, wherein said reactive carbonyl group is a diacetone group.

7. A process for forming a thermosensitive recording material according to claim 2, wherein the thermosensitive coloring layer coating liquid comprises a leuco dye, a developer capable of inducing a color formation with an application of heat, and an acidic filler.

8. A process for forming thermosensitive recording material according to claim 7, wherein the acidic filler is silica.

9. A process for forming a thermosensitive recording material according to claim 2, further comprising the step of:
   forming a back layer which comprises a polyvinyl alcohol having reactive carbonyl groups, a hydrazide compound and a basic filler on the support before applying the thermosensitive coloring layer coating liquid.

10. A process for forming a thermosensitive recording material according to claim 9, wherein the basic filler is selected from the group consisting of aluminum hydroxide and calcium carbonate.

* * * * *